(12) United States Patent  
Bookbinder et al.

(10) Patent No.: US 7,928,026 B2
(45) Date of Patent: Apr. 19, 2011

(54) SYNTHETIC SILICA MATERIAL WITH LOW FLUENCE-DEPENDENT-TRANSMISSION AND METHOD OF MAKING THE SAME

(75) Inventors: Dana Craig Bookbinder, Corning, NY (US); Kenneth Edward Hrdina, Horseheads, NY (US); Glenn Eric Kohnke, Corning, NY (US); Lisa Anne Moore, Corning, NY (US); Susan Lee Schiefelbein, Ithaca, NY (US); Charlene Marie Smith, Corning, NY (US); Ulrich W H Neukirch, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1145 days.

(21) Appl. No.: 11/261,005

(22) Filed: Oct. 28, 2005

(65) Prior Publication Data

US 2007/0004579 A1 Jan. 4, 2007

Related U.S. Application Data

(60) Provisional application No. 60/696,105, filed on Jun. 30, 2005.

(51) Int. Cl.
*C03C 3/06* (2006.01)
*C03B 32/00* (2006.01)
*C03B 15/00* (2006.01)
*C03B 17/00* (2006.01)
*C03B 19/00* (2006.01)
*C03B 19/06* (2006.01)

(52) U.S. Cl. .............. 501/54; 65/111; 65/17.6; 65/17.4

(58) Field of Classification Search .............. 501/54, 501/53; 65/111, 17.4, 17.6
See application file for complete search history.

(56) References Cited

U.S. PATENT DOCUMENTS

| 5,086,352 | A | | 2/1992 | Yamagata et al. ........... 359/350 |
|---|---|---|---|---|
| 5,325,230 | A | | 6/1994 | Yamagata et al. ........... 359/350 |
| 5,410,428 | A | | 4/1995 | Yamagata et al. ........... 359/350 |
| 5,616,159 | A | | 4/1997 | Araujo et al. ................ 65/174 |
| 5,668,067 | A | | 9/1997 | Araujo et al. ................ 501/54 |
| 6,094,941 | A | | 8/2000 | Fujinoki et al. .............. 65/301 |
| 6,143,676 | A | * | 11/2000 | Ohashi et al. ................ 501/54 |
| 6,339,033 | B2 | | 1/2002 | Jinbo et al. ................... 501/54 |
| 6,451,719 | B1 | * | 9/2002 | Yamagata ..................... 501/54 |
| 2003/0051507 | A1 | * | 3/2003 | Ikuta et al. ................... 65/30.1 |

(Continued)

FOREIGN PATENT DOCUMENTS

EP 0401845 12/1994

(Continued)

OTHER PUBLICATIONS

C.M. Smith, N.F. Borrelli, R.J. Araujo, "Transient Absorption in Excimer-Exposed Silica," Appl. Optics 39, 5778-5784 (2000).

(Continued)

*Primary Examiner* — Jerry Lorengo
*Assistant Examiner* — Noah S Wiese
(74) *Attorney, Agent, or Firm* — Siwen Chen; Robert P. Santandrea

(57) ABSTRACT

Disclosed in the application are a synthetic silica glass having low fluence-dependent transmission, particularly at about 193 nm, and a process for making the same. The glass may desirably exhibit a low level of fluorescence at 290 and 390 nm when activated at about 248 nm. The glass may desirably exhibit low level of LIWFD, [SiH*] and/or [ODC].

13 Claims, 4 Drawing Sheets

U.S. PATENT DOCUMENTS

| | | | |
|---|---|---|---|
| 2003/0115904 A1* | 6/2003 | Kuhn et al. | 65/17.6 |
| 2005/0239626 A1* | 10/2005 | Fujinoki et al. | 501/54 |
| 2006/0234848 A1* | 10/2006 | Kuehn et al. | 501/54 |
| 2007/0027018 A1* | 2/2007 | Ogawa et al. | 501/53 |
| 2007/0105704 A1* | 5/2007 | Bookbinder et al. | 501/54 |

FOREIGN PATENT DOCUMENTS

| | | |
|---|---|---|
| EP | 0691312 | 1/1996 |
| EP | 1061052 | 1/1999 |
| EP | 1094040 | 4/2001 |
| EP | 1340722 | 9/2003 |
| EP | 1586544 | 10/2005 |
| WO | WO2005/082800 | 9/2005 |

OTHER PUBLICATIONS

Yamagata, S., Improvement of Excimer Laser Durablilty of Silica Glass, Transactions of the Materials Research Society if Japan, vol. 8, pp. 82-96 (1992).

Faile, S.P., and Roy, D. M., Mechanism of Color Center Destruction in Hydrogen Impregnated Radiation Resistant Glasses, Materials Research Bull., vol. 5, pp. 385-390 (1970).

Shelby, J. E., Radiation Effect in Hydrogen-impregnated Vitreous Silica, J. Applied Physics, vol. 50, No. 5, pp. 3702-3706 (1979).

L. Skuja, "Isoelectronic series of twofold corredinated Si, Ge, and Sn atoms in glassy $SiO_2$: a luminescence study," J. Non-Cryst. Solids 149 (1992) 77-95.

V. Lou, R. Sato, and M. Tomozawa, "Hydrogen Diffusion in Fused Silica at High Temperatures," J. Non-Cryst. Solids, vol. 315, pp. 13-19, 2003.

Khotimchenko et al., "Determining the content of hydrogen dissolved in quartz glass using the methods of Raman scattering and mass spectrometry," Zhurnal Prikladnoi Spektroskpoii 46 (1987) 987-991.

* cited by examiner

SYNTHETIC SILICA MATERIAL WITH LOW FLUENCE-DEPENDENT-TRANSMISSION AND METHOD OF MAKING THE SAME

CROSS-REFERENCE TO RELATED APPLICATION

The present application claims priority of U.S. provisional application Ser. No. 60/696,105 filed on Jun. 30, 2005 and entitled "Synthetic Silica Material With Low Fluence-Dependent-Transmission And Method of Making the Same," the content of which is relied upon and incorporated herein by reference in its entirety.

FIELD OF THE INVENTION

The present invention relates to synthetic silica material and process for making the same. In particular, the present invention relates to synthetic silica material exhibiting a low fluence-dependent-transmission at about 193 nm and method of making the same. The present invention is useful, for example, in the production of synthetic silica material for use in applications such as 193 nm photolithography tools.

BACKGROUND OF THE INVENTION

As practiced commercially, fused silica optical members such as lenses, prisms, filters, photomasks, reflectors, etalon plates and windows, are typically manufactured from bulk pieces of fused silica made in large production furnaces. Bulk pieces of fused silica manufactured in large production furnaces are known in the art as boules or ingots. Blanks are cut from boules or ingots, and finished optical members are manufactured from glass blanks, utilizing manufacturing steps that may include, but are not limited to, cutting, polishing, and/or coating pieces of glass from a blank. Many of these optical members are used in various apparatus employed in environments where they are exposed to ultraviolet light having a wavelength of about 360 nm or less, for example, an excimer laser beam or some other ultraviolet laser beam. The optical members are incorporated into a variety of instruments, including lithographic laser exposure equipment for producing highly integrated circuits, laser fabrication equipment, medical equipment, nuclear fusion equipment, or some other apparatus which uses a high-power ultraviolet laser beam.

As the energy and pulse rate of lasers increase, the optical members which are used in conjunction with such lasers are exposed to increased levels of energy. Fused silica has become widely used as the material of choice for optical members in such laser-based optical systems due to their excellent optical properties and resistance to laser induced damage.

Laser technology has advanced into the short wavelength, high energy ultraviolet spectral region, the effect of which is an increase in the frequency (decrease in wavelength) of light produced by lasers. Of particular interest are short wavelength excimer lasers operating in the UV and deep UV (DUV) and vacuum UV wavelength ranges, which include, but are not limited to, lasers operating at about 248 nm, 193 nm, 157 nm and even shorter wavelengths. Excimer laser systems are popular in microlithography applications, and the shortened wavelengths allow for increased feature resolution and thus line densities in the manufacturing of integrated circuits and microchips, which enables the manufacture of circuits having decreased feature sizes. A direct physical consequence of shorter wavelengths (higher frequencies) is higher photon energies in the beam due to the fact that each individual photon is of higher energy. In such excimer laser systems, fused silica optics are exposed to high energy photon irradiation levels for prolonged periods of time, and this results in the degradation of the optical properties of the optical members.

It is known that such laser induced degradation adversely affects the optical properties and performance of the fused silica optics by decreasing light transmission levels, discoloring the glass, altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, is susceptible to laser damage to various degrees.

A common suggestion has been to increase the OH content of such glass to a high level. For example, Escher, G. C., *KrF Laser Induced Color Centers In Commercial Fused Silicas*, SPIE Vol. 998, Excimer Beam Applications, pp. 30-37 (1988), confirms that defect generation rate is dependent upon the fused silica OH content, and that "wet" silica is the material of choice for KrF applications. Specifically, they note that high OH content silica is more damage resistant than low OH silica.

U.S. Pat. No. 5,086,352 and the related U.S. Pat. No. 5,325,230 has also disclosed that the ability to resist optical deterioration from exposure to a short wavelength ultraviolet laser beam depends on the OH group content in the presence of hydrogen. Specifically, these references show that for high purity silica glass having low OH content, KrF excimer laser durability is poor. Thus, they suggest an OH content of at least 50 ppm. Similarly, Yamagata, S., *Improvement of Excimer Laser Durability of Silica Glass*, Transactions of the Materials Research Society of Japan, Vol. 8, pp. 82-96 (1992), discloses the effect of dissolved hydrogen on fluorescence emission behavior and the degradation of transmission under irradiation of KrF excimer laser ray for high purity silica glass containing OH groups up to 750 ppm by weight such as those synthesized from high purity silicon tetrachloride by the oxygen flame hydrolysis method.

Others have also suggested methods of increasing the optical durability of fused silica. For example, Faile, S. P., and Roy, D. M., *Mechanism of Color Center Destruction in Hydrogen Impregnated Radiation Resistant Glasses*, Materials Research Bull., Vol. 5, pp. 385-390 (1970), have disclosed that hydrogen-impregnated glasses tend to resist gamma ray-induced radiation damage. Japanese Patent Abstract 40-10228 discloses a process by which a quartz glass article made by melting is heated at about 400 to 1000° C. in an atmosphere containing hydrogen to prevent colorization due to the influence of ionizing radiation (solarization). Similarly, Japanese Patent Abstract 39-23850 discloses that the transmittance of UV light by silica glass can be improved by heat treating the glass in a hydrogen atmosphere at 950 to 1400° C. followed by heat treatment in an oxygen atmosphere at the same temperature range.

Shelby, J. E., *Radiation Effects in Hydrogen-impregnated Vitreous Silica*, J. Applied Physics, Vol. 50, No. 5, pp. 3702-06 (1979), suggests that irradiation of hydrogen-impregnated vitreous silica suppresses the formation of optical defects, but that hydrogen impregnation also results in the formation of large quantities of bound hydroxyl and hydride, and also results in a change in density of the glass.

Recently, U.S. Pat. No. 5,410,428 has disclosed a method of preventing induced optical degradation by a complicated combination of treatment processes and compositional manipulations of the fused silica members to achieve a particular hydrogen concentration and refractive index, in order to improve resistance to UV laser light degradation. It is suggested that under such UV irradiation some chemical bonds between silicon and oxygen in the network structure of the fused silica is generally broken and then rejoins with other structures resulting in an increased local density and an increased local refractive index of the fused silica at the target area.

More recently, U.S. Pat. No. 5,616,159 to Araujo et al. disclosed a high purity fused silica having high resistance to optical damage up to $10^7$ pulses (350 mJ/cm$^2$/pulse) at the laser wavelength of 248 nm and a method for making such glass. The composition disclosed in Araujo et al. comprises at least 50 ppm OH and has a concentration of $H_2$ greater than $1 \times 10^{18}$ molecules/cm$^3$.

Recently, a new phenomenon has been observed: the transmission of silica glass exposed to ultraviolet light radiation (especially in the deep UV and vacuum UV region, such as at 248 nm, 193 nm and shorter wavelength) depends on the intensity of the radiation. In many applications, especially photolithography, for similar reasons described in relation to the desirability of low laser-induced damage, it is desired that the variation of transmission of the silica glass as a function of the intensity of the radiation is low. Particularly, a high dependence of transmission on the irradiation intensity can result in the inhomogeneous light intensity on the wafer, leading to uneven exposure of the photoresist and hence poor developed image.

The laser-induced damage discussed in the references summarized above are related to damage after a certain accumulative dosage of irradiation, such as the total number of pulses at a given fluence. However, none of the references listed above discusses the dependence of the transmission on the intensity (fluence) of the radiation, much less a solution to this problem.

Fluorescence of synthetic silica glass when exposed to deep UV and vacuum UV is known. Fluorescence is undesirable partly because it is an indicator of the presence of undesirable defects in the silica glass. Moreover, the fluorescence may interfere with the proper exposure of the photoresist if it is within the concerned wavelength range.

Therefore, there exists a need for a synthetic silica material having improved optical performance in terms of transmission dependence on UV radiation intensity, and method of making the same. The present invention satisfies this need.

SUMMARY OF THE INVENTION

According to a first aspect of the present invention, it is provided a synthetic silica material having low fluence-dependent transmission ("FDT") in the UV region. The silica glass of the present invention when exposed to excimer laser at about 193 nm has a measured FDT of less than about $5.0 \times 10^{-4}$ cm·pulse/mJ, in certain embodiments advantageously less than about $1.0 \times 10^{-4}$ cm·pulse/mJ, in certain embodiments more advantageously less than about $5.0 \times 10^{-5}$ cm·pulse/mJ, in certain embodiments still more advantageously less than about $1.0 \times 10^{-5}$ cm·pulse/mJ, in certain embodiments still more advantageously less than about $5.0 \times 10^{-6}$ cm·pulse/mJ, in certain embodiments most advantageously less than about $1.0 \times 10^{-6}$ cm·pulse/mJ. The synthetic silica glass of the present invention has an OH concentration of less than or equal to about 900 ppm by weight and comprises $H_2$ in the range from about $1 \times 10^{16}$ to about $6 \times 10^{19}$ molecules/cm$^3$, in certain embodiments advantageously from about $1 \times 10^{16}$ to about $5 \times 10^{18}$ molecules/cm$^3$, in certain embodiments more advantageously from about $1 \times 10^{16}$ to about $5 \times 10^{17}$ molecules/cm$^3$, in certain embodiments still more advantageously from about $1 \times 10^{16}$ to about $2 \times 10^{17}$ molecules/cm$^3$, and in certain embodiments still more advantageously from about $1 \times 10^{16}$ to about $1 \times 10^{17}$ molecules/cm$^3$.

In a preferred embodiment of the synthetic silica glass of the present invention, the glass contains OH in the amount by weight of about 10-500 ppm, in certainly embodiments advantageously about 40-300 ppm, in certain embodiments more advantageously about 40-150 ppm.

In yet another preferred embodiment of the synthetic silica glass of the present invention, the glass contains OH in the amount by weight of about 100-700 ppm, in certain embodiments advantageously about 200-550 ppm, and in certain embodiments more advantageously about 200-450 ppm.

Preferably, the synthetic silica glass of the present invention has a fictive temperature of lower than about 1150° C., in certain embodiments more preferably lower than about 1000° C., in still certain other embodiments more preferably lower than about 950° C., in still certain other embodiments more preferably lower than about 900° C. Typically, the fictive temperature of the synthetic silica glass of the present invention is higher than about 800° C.

Preferably, the synthetic silica glass of the present invention has a low laser induced wave-front distortion (LIWFD) when exposed to deep UV and vacuum UV radiation, especially at about 193 nm. Preferably, the synthetic silica glass of the present invention, when subject to 10 billion pulses of an excimer laser at about 193 nm having a fluence of approximately 70 µJ/cm$^2$·pulse and a pulse length of about 25 ns, exhibits a laser induced wavefront distortion, measured at 633 mm, of between about −1.0 and about 1.0 nm/cm. Preferably, the synthetic silica glass of the present invention exhibits a normalized wavefront distortion L633 when subject to excimer laser pulses at about 193 nm, measured at about 633 nm, wherein $0 \leq L633 \leq 1.0$, in certain embodiments preferably $0 \leq L633 \leq 0.5$, in certain embodiments more preferably $0 \leq L633 \leq 0.4$, in certain other embodiments more preferably $0 \leq L633 \leq 0.3$. Preferably the synthetic silica glass of the present invention exhibits a normalized wavefront distortion L193 when subject to excimer laser pulses at about 193 nm, measured at about 193 nm, wherein $0 \leq L193 \leq 1.0$, in certain embodiments preferably $0 \leq L193 \leq 0.5$, in certain embodiments more preferably $0 \leq L193 \leq 0.4$, in certain other embodiments more preferably $0 \leq L193 \leq 0.3$. Preferably, the synthetic silica glass of the present invention has the L633 and/or L193 level described in this paragraph, as well as a low OH concentration of less than or equal to about 160 ppm by weight.

According to a second aspect of the present invention, it is provided a process of making synthetic silica glass having low FDT when exposed to irradiation at about 248 nm or 193 nm.

According to one preferred embodiment of the process of the present invention, it is provided a process of treating a transparent consolidated synthetic silica glass having an OH content of less than or equal to about 900 ppm by weight in the presence of $H_2$ gas at a temperature lower than 700° C., preferably lower than about 600° C., more preferably lower than 500° C., to a loaded $H_2$ level between about $1 \times 10^{16}$ to about $6 \times 10^{19}$ molecules/cm$^3$, in certain embodiments advantageously from about $1 \times 10^{16}$ to about $5 \times 10^{18}$ molecules/cm$^3$, in certain embodiments more advantageously from about $1 \times 10^{16}$ to about $5 \times 10^{17}$ molecules/cm$^3$, in certain embodiments still more advantageously from about $1\times10^{16}$ to about $2\times10^{17}$ molecules/cm³, and in certain embodiments still more advantageously from about $1\times10^{16}$ to about $1\times10^{17}$ molecules/cm³, such that the glass upon hydrogen-loading has a desired low level of FDT. According to this embodiment, it is advantageous that prior to the hydrogen loading treatment, the glass has an $H_2$ concentration of less than about $1\times10^{16}$ molecules/cm³. According to this embodiment, it is preferred that the glass is subject to an annealing step before the hydrogen loading treatment, such that the silica glass obtained has a fictive temperature between about 800-1150° C., preferably lower than about 1000° C., more preferably lower than about 950° C., most preferably lower than about 900° C. According to this embodiment, it is preferred that the glass comprises OH in the amount by weight of about 10-500 ppm, more preferably about 40-300 ppm, most preferably about 40-150 ppm. According to this embodiment, it is preferred that the treated glass has a FDT of less than about $5.0\times10^4$ cm·pulse/mJ, in certain embodiments advantageously less than about $1.0\times10^4$ cm·pulse/mJ, in certain embodiments more advantageously less than about $5.0\times10^{-5}$ cm·pulse/mJ, in certain embodiments still more advantageously less than about $1.0\times10^{-5}$ cm·pulse/mJ, in certain embodiments still more advantageously less than about $5.0\times10^{-6}$ cm·pulse/mJ, in certain embodiments most advantageously less than about $1.0\times10^{-6}$ cm·pulse/mJ, when exposed to excimer laser at about 193 nm.

According to yet another preferred embodiment of the process of the present invention, it is provided a process of treating a transparent consolidated synthetic silica glass having an OH concentration of less than or equal to about 900 ppm by weight, comprising treating the glass in the presence of $H_2$ gas at a temperature higher than about 700° C., more preferably between about 700-1200° C., and most preferably between about 700-1100° C., to a loaded $H_2$ level between about $1\times10^{16}$ to about $6\times10^{19}$ molecules/cm³, in certain embodiments advantageously from about $1\times10^{16}$ to about $5\times10^{18}$ molecules/cm³, in certain embodiments more advantageously from about $1\times10^{16}$ to about $5\times10^{17}$ molecules/cm³, in certain embodiments still more advantageously from about $1\times10^{16}$ to about $2\times10^{17}$ molecules/cm³, and in certain embodiments still more advantageously from about $1\times10^{16}$ to about $1\times10^{17}$ molecules/cm³, such that the glass upon hydrogen loading treatment has a low FDT. According to this embodiment of the process of the present invention, it is preferred that prior to the hydrogen loading treatment the glass has an $H_2$ concentration of less than about $1\times10^{16}$ molecules/cm³. According to this embodiment, it is preferred that the glass is subject to an annealing step before, during or after the hydrogen loading treatment, such that the silica glass obtained has a fictive temperature between about 800-1150° C., in certain embodiments preferably lower than 1000° C., in certain embodiments still more preferably lower than about 950° C., in certain embodiments still more preferably lower than about 900° C. According to this embodiment, it is preferred that the glass comprises OH in the amount by weight of higher than about 100 ppm, in certain embodiments more preferably between about 100-700 ppm, in certain embodiments still more preferably between about 200-550 ppm, in certain embodiments still more preferably between about 200-450 ppm. According to this embodiment, it is preferred that the treated glass has a FDT of lower than about $5.0\times10^{-4}$ cm·pulse/mJ, in certain embodiments advantageously less than about $1.0\times10^{-4}$ cm·pulse/mJ, in certain embodiments more advantageously less than about $5.0\times10^{-5}$ cm·pulse/mJ, in certain embodiments still more advantageously less than about $1.0\times10^{-5}$ cm·pulse/mJ, in certain embodiments still more advantageously less than about $5.0\times10^{-6}$ cm·pulse/mJ, in certain embodiments most advantageously less than about $1.0\times10^{-6}$ cm·pulse/mJ, when exposed to excimer laser at about 193 nm.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION OF THE INVENTION

Figure 1:
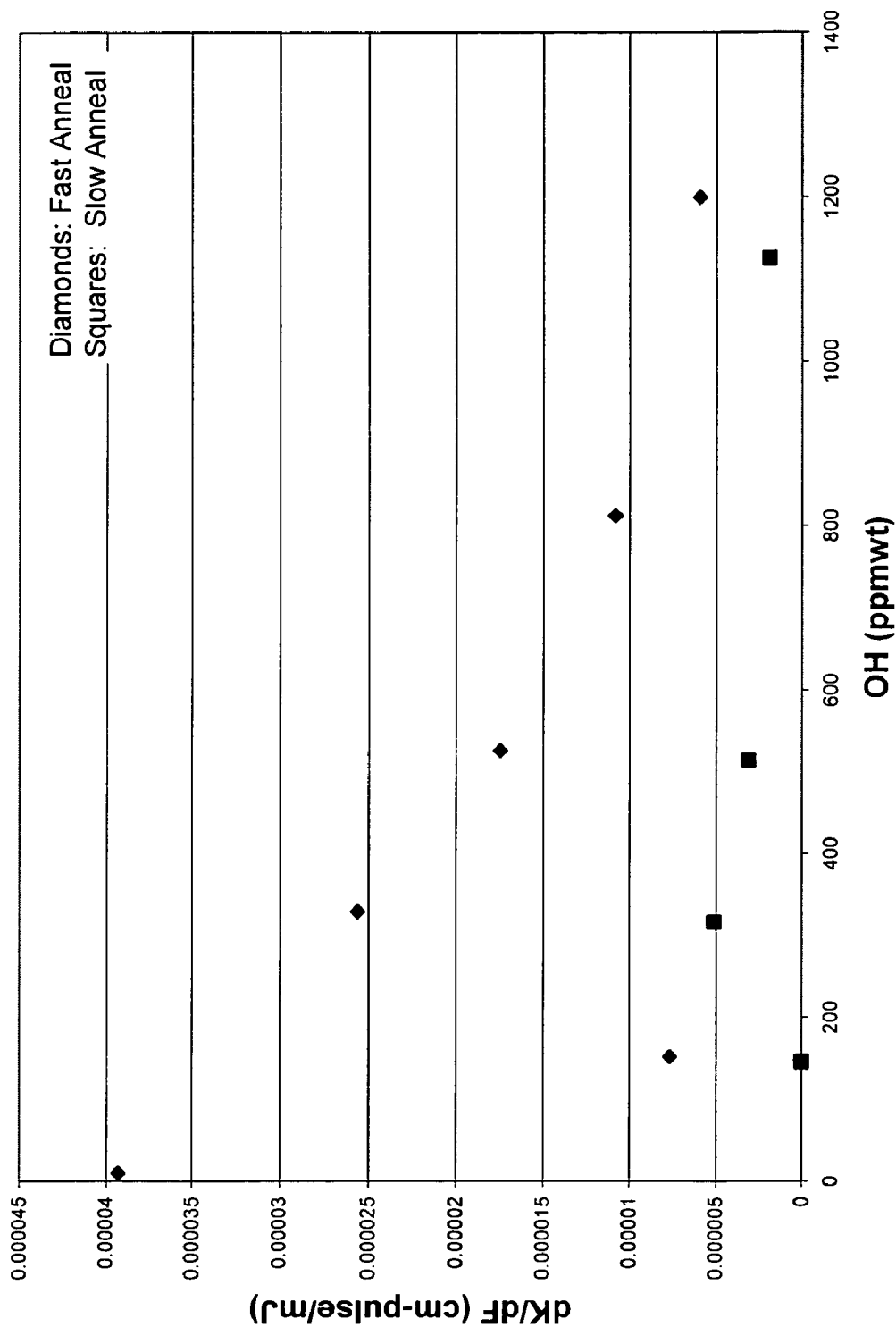
FIG. 1 is a diagram showing dK/dF as a function of [OH] of a series of synthetic silica glass samples $H_2$ loaded at 350° C.

As mentioned above, it is highly desirable to provide a silica glass material for use in UV lithography systems which exhibits minimal change in transmission when exposed to different intensities (fluences) of ultraviolet light, such as an ArF or KrF excimer laser. This property is commonly referred to as fluerice-dependent transmission (FDT) or rapid damage process (RDP). In addition to low FDT, it is desirable that the silica exhibits high initial transmission, low laser-induced wavefront distortion (LIWFD), and low laser-induced absorption (IA). In the present application, a low level of FDT means the silica glass of the present invention when exposed to eximer laser at about 193 nm has a measured FDT of less than about $1.0\times10^{-4}$ cm·pulse/mJ using the measuring protocol as described below.

It is known that exposing silica to excimer UV laser pulses, particularly those in the deep UV and vacuum UV regions, creates structural changes in the glass that impact both its transmission and optical pathlength. Strained bonds in the silica network are photolyzed to create defects that absorb in the UV according to the following hypothesized reactions:

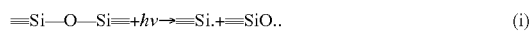

$$\equiv Si-O-Si\equiv + h\nu \rightarrow \equiv Si\cdot + \equiv SiO\cdot \quad (i)$$

The E' center ($\equiv Si\cdot$) has a strong absorption band at 215 nm with a tail that extends to 193 nm. The non-bridging oxygen hole center (NBOHC, $\equiv SiO\cdot$) has an absorption band around 260 nm. It does not significantly impact transmission at 193 nm, but does have a strong impact on 248 nm transmission. Thus, the creation of E' centers under the laser leads to decreased transmission of 193 nm laser light. Transmission loss by mechanism (i), which usually occurs over millions or billions of pulses of exposure, is referred to as laser-induced absorption and is highly undesirable in UV lithography lens materials. It has been shown that the incorporation of molecular hydrogen into silica glass mitigates laser induced absorption. Without intending to be bound by a particular theory, it is generally believed that during exposure, hydrogen diffuses to the defect sites and reacts with them to create less-absorbing species. For example, the following reaction (ii) may occur:

$$\equiv Si \cdot + \tfrac{1}{2} H_2 \rightarrow \equiv SiH. \quad (ii)$$

Thus, silica used for UV lithography lenses typically contains some molecular hydrogen.

In silica made by the direct-to-glass flame hydrolysis processes, $H_2$ is usually naturally incorporated in the consolidated glass during the glass-making process where the silica soot generated is directly consolidated into transparent silica glass in the furnace. For silica made by the soot-to-glass process, the hydrogen must be added to the glass to a desired level. During this $H_2$ loading process, the hydrogen can react to form SiH and SiOH in the silica glass in accordance with the following reaction (iii):

$$\equiv Si-O-Si\equiv + H_2 \rightarrow \equiv SiH + \equiv SiOH. \quad (iii)$$

Such $H_2$ loading may be carried out when the soot preform is consolidated into condensed glass. Alternatively, such $H_2$ loading may be implemented after the glass is consolidated in an environment largely free of $H_2$.

Under reducing conditions, such as during the $H_2$ loading process, oxygen deficient centers (ODCs: $\equiv Si-Si\equiv$ bonds) may also be formed in the glass network.

The presence of SiH and ODCs in the silica is problematic because both SiH and ODCs can be photolyzed by the UV laser to form E' centers. For ODCs, the reaction is believed to be:

$$\equiv Si-Si\equiv + h\nu \rightarrow 2 \equiv Si\cdot. \quad (iv)$$

Fluence-dependent transmission (FDT) is described in Smith et al, *Transient Absorption in Excimer-Exposed Silica*, Appl. Optics 39, 5778-5784 (2000) as being caused by bond breaking and recombination under the laser at silicon hydride defect sites in the silica glass according to the reactions:

$$\equiv SiH^* + h\nu \rightarrow \equiv Si\cdot + H, \quad (v)$$

(reaction rate: $k_1 *I$, where I is the intensity of the light);

$$\equiv Si\cdot + H \rightarrow \equiv SiH, \quad (vi)$$

(reaction rate: $k_2$);

$$\equiv SiH + h\nu \rightarrow \equiv Si\cdot + H, \quad (vii)$$

(reaction rate: $k_3 *I$).

The term "SiH*" is used to designate silicon hydride sites created during glass processing such as soot-lay down and hydrogen loading, while the term "SiH" designates silicon hydride created during exposure to UV radiation. The E' center ($\equiv Si\cdot$) and H created by photolysis reaction (v) or (vii) are referred to as a geminate pair, since they are derived from the same source and remain in proximity to one another.

Reactions (i), (iv), (v), and (vii) create E' centers, while, simultaneously, reactions (ii) and (vi) result in the destruction of E' centers. All of the reactions (i, ii, iv-vii) occur during laser exposure, but the reaction rates are different. Reactions (v-vii) are believed to occur on a faster timescale than the others and thus describe the response of the glass to rapid changes in laser intensity. The magnitude of the change in transmission with fluence is directly related to the initial SiH* concentration in the glass and is also impacted by the presence of ODCs. The creation of SiH* (reaction (iii)) can be minimized by $H_2$ loading at low temperatures (e.g., <500° C.), but it is desirable to do high temperature $H_2$ loading because it is faster. Thus a means for suppressing SiH* formation during high temperature $H_2$ loading is desired.

US patent application publication No. 2003/0,115,904 discloses an upper limit on the $H_2$ concentration of about $4 \times 10^{16}$ molecules/cm$^3$ in silica containing <450 ppm OH for acceptable FDT. It further discloses a relationship between laser-induced wavefront distortion behavior and OH level in the glass, but does not discuss any relationship between OH and FDT. U.S. Pat. No. 6,094,941 discloses a process for improving the UV radiation resistance of silica made by the flame hydrolysis (direct-to-glass) method involving the steps of heat treating the glass in an oxidizing atmosphere to remove $H_2$ and ODCs, then $H_2$ loading the glass to a level of $>1 \times 10^{17}$ molecules/cm$^3$ by heating it in hydrogen-containing atmosphere at below 600° C., so that ODCs are not formed during the process, then carrying out another heat treatment to establish a uniform $H_2$ distribution. Direct-to-glass flame hydrolysis silica typically contains >900 ppm OH. U.S. Pat. No. 6,339,033 discloses a method for heat treating a hydrogen-containing silica glass, such as from the direct-to-glass method, to reduce the concentration of SiH* in the glass, but does not include a step of subsequently reheating the glass in a hydrogen-containing atmosphere. Silica glass made by the soot-to-glass process typically contains no detectable molecular hydrogen (i.e., $<\sim 10^{16}$ molecules/cm$^3$) following consolidation if $H_2$ gas is not specifically added during consolidation.

High purity fused silica is used to make lenses for UV lithography stepper systems. Changes in transmission of the silica lenses with light intensity are undesirable because they will lead to different levels of exposure across the wafer. For this reason, it is highly desirable that the stepper lenses are made of silica with very low FDT. Our invention provides a composition and method for making silica that exhibits very low FDT without negatively impacting other optical properties such as laser-induced wavefront distortion and transmission.

As mentioned supra, the present inventors have observed that transient absorption of synthetic silica glass (K) in the UV region is dependent on the fluence (F, expressed in terms of mJ/cm$^2$·pulse) of the UV irradiation the glass is exposed to. The relationship between the transient absorption of the glass and radiation fluence can generally be represented by a least-squares linear fitting curve of the measured absorption and fluence data. Thus, as used herein, fluence-dependent transmission (FDT) is defined as the slope of the linear fitting curve (dK/dF). Of great interest for silica glass is its FDT at UV wavelengths at which the glass typically finds application, such as about 248 nm and 193 nm. In the present application, FDT is measured by exposing silica glass to UV excimer laser pulses at about 193 nm. The fluence of measuring UV radiation is from 1 mJ/cm$^2$·pulse to about 10 mJ/cm$^2$·pulse. The repetition rate of the laser is around 400 Hz. Absorption (K) of the glass is calculated from the measured internal transmission ($T_i$, expressed in terms of percentage per cm) as follows:

$$K = 2 - \log T_i.$$

For example, the absorption $K_1$ of a glass having an internal transmission $T_{i,1}$ of 99.00% is calculated as follows:

$$K_1 = 2 - \log_{i,1} = 2 - \log 99.00 = 2 - 1.996 = 0.004.$$

For the purpose of measurement of FDT in the present application, the internal transmission ($T_i$) is the measured transmission at 193 nm corrected for surface reflection losses and normalized to a 1 cm pathlength after exposing the glass to a certain number of excimer laser pulses of irradiation light beam at about 193 nm at varying fluences. The actual number of pulses the glass is exposed to prior to measuring FDT is critical; it should be large enough to photolyze all of the SiH* (i.e., reaction (v)) but not enough to allow significant occurrence of reaction (i). Such number may range, for example, from 250 thousand to 5 million pulses at a constant fluence of about 1 mJ/(cm$^2$·pulse) to about 10 mJ/(cm$^2$·pulse). It is preferred that the number of pulses the glass is exposed to at different fluences when transmission ($T_i$) is measured is consistent during the FDT measurement. In the present application, 90,000 pulses of excimer laser at about 193 nm are applied to the glass consistently in all transmission measurements at various fluences. Furthermore, it is preferred that the measurement of transmission ($T_i$) is conducted online, viz., when the glass is being exposed to the radiation. The transmission ($T_i$) of the glass may be measured in a direction parallel to the direction of UV irradiation beam, or in a direction having an angle, such as 90°, with the UV irradiation beam. If a measuring light beam different from the exposing irradiation beam is used in the measurement of transmission ($T_i$), it is required that the measuring light beam does not significantly change the transmission ($T_i$) of the glass. During measurement of the transmission ($T_i$) at different exposing irradiation fluence (F), the exposing irradiation fluence (F) may increase, decrease, or fluctuate over time.

Fluorescence spectra were measured using 248 nm (KrF laser) excitation. It should be noted that the fluorescence levels as indicated in the relevant drawings in the present application are presented in arbitrary units which are specific to the particular measuring equipment. The absolute amount of fluorescence might not be duplicable in a different measuring equipment. However, since the samples were measured under the same conditions in the same equipment, their spectrum curves can be used to compare their fluorescence performance.

The preferred method, also the method used herein, for determination of interstitial molecular $H_2$ in fused silica is Raman scattering. Raman spectrometry is obtained using a T64000 spectrometer from HORIBA Jobin Yvon Inc. with an EEV charge-coupled device (CCD) detector. The hydrogen molecule concentration in molecules/cm$^3$ was obtained from the ratio of the intensity detected from the hydrogen molecule scattering peak at 4135 cm$^{-1}$ ($I_{4135}$) to the intensity of the silica scattering peak at 800 cm$^{-1}$ ($I_{800}$), i.e., $I_{4135}/I_{800}$, in the laser Raman spectrum (S, V. S. Khotimchenkô et al, Prikladnoi Spektroskopii, 46 (6), 987-997 (1986)). More specifically, the intensities of the peaks were determined by integrating the areas under the peaks using a linear or quadratic fit to the background. It should be noted that in the present method, the limit of detection was 1×10$^{16}$ molecules/cm$^3$.

The OH group has characteristic absorption bands near 2.72 μm (3676 cm$^{-1}$), 2.21 μm (4525 cm$^{-1}$) and 1.38 μm (7246 cm$^{-1}$) in fused silica. Concentration of OH was measured by FTIR using the peak height of either the 3670 cm$^{-1}$ or the 4500 cm$^{-1}$ absorption band.

The OH concentration, c, in mol·liter$^{-1}$, is derived from the Beers-Lambert Law $$A = \epsilon \cdot c \cdot b,$$

where the absorbance $A = \log(T_{ref}/T_{OH})$; $T_{ref}$=Transmittance of sample at reference position, a non-absorbing wavelength such as 4000 cm$^{-1}$; $T_{OH}$=Transmittance of sample at OH absorption peak (~3676 cm$^{-1}$ for silica); $\epsilon$ is the molar absorptivity in liter·mol$^{-1}$·cm$^{-1}$; c is concentration in mol·liter$^{-1}$; and b is the pathlength (sample thickness) in cm:

$$c(\text{mol·liter}^{-1}) = A/(\epsilon \cdot b).$$

Concentration of OH in ppm by weight can thus be calculated from c in mol·liter$^{-1}$ using the density of the silica glass (approximately 2.2 g/cm$^3$) and molecular weight of OH (approximately 17 g/mol). The constant $\epsilon$ for high purity silica glass at a particular wavelength is available in the prior art.

Fictive temperature is a temperature at which a frozen-in glass structure would be at equilibrium. The average Si—O—Si bond angle is a function of fictive temperature. The infrared absorption wavelength, or frequency, of Si—O—Si species varies with bond angle. Thus infrared absorption can be used to determine an approximate fictive temperature. An empirical relation between fictive temperature and absorption frequency is given in the prior art such as Agarwal et al., *A simple IR spectroscopic method for determining fictive temperature of silica glasses*, Journal of Non-crystalline Solids 185 (1995) 191. Raman scattering can also be used to determine fictive temperature using the scattering frequency of silica defects related to strained ring structure.

Laser induced wavefront distortion of the bulk glass ("bulk LIWFD") is measured at 633 nm or 193 nm using method and apparatus available in the prior art. Normalized LIWFD of the glass subjected to pulsed ArF excimer laser (about 193 nm) measured at 633 nm (L633) and 193 nm (L193) are calculated in accordance with the following equations:

$$L633 = \frac{LB633}{0.95 \cdot \left(N \cdot \frac{F^2}{\tau}\right)^{0.6}} \text{ and } L193 = \frac{LB193}{1.67 \cdot \left(N \cdot \frac{F^2}{\tau}\right)^{0.6}},$$

where LB633 is bulk LIWFD measured at 633 nm in nm/cm, LB193 is bulk LIWFD measured at 193 nm in nm/cm, N is number of pulse in million of the ArF excimer laser to which the sample was exposed to when the LB633 or LB193 is measured, F is the fluence of the ArF excimer laser in mJ/cm$^2$·pulse, and $\tau$ is pulse length of the ArF excimer laser in ns. The L633 and L193 values enable direct comparison of LIWFD performance of the silica glasses at different N, F and $\tau$ values.

The present inventors have discovered that the fluence-dependent transmission of silica glass can be minimized by controlling the OH content of the silica glass. In general, dK/dF decreases with increasing OH content. By controlling the OH content of the glass, the magnitude of dK/dF is very small even when $H_2$ is loaded at high temperatures ($\geq 800°$ C.) and good LIWFD behavior can be achieved.

The present inventors prepared high purity silica glasses with OH levels from 0.1-1200 ppm by weight by the soot-to-glass method as described in co-pending U.S. patent application Ser. No. 11/064,341 entitled "Synthetic Silica Glass Optical Material Having High Resistance to Laser Induced Damage." The concentration of molecular hydrogen in the consolidated silica glass was below the detection limit of the Raman measurement (<1×10$^{16}$ molecules/cm$^3$). The concentration of molecular hydrogen can be estimated from the measured OH concentration in the glass and the consolidation temperature by using simple gas phase thermochemistry of water dissociation and the solubility of $H_2$ in silica. In all cases, the calculated value was <1×10$^{16}$ molecules/cm$^3$.

All samples in the present application for $H_2$ loading, shown in TABLE I, were prepared from soot-to-glass silica blanks consolidated in an atmosphere largely free of hydrogen ($H_2$ gas was not specifically added in the consolidation atmosphere, but a very small amount of $H_2$ may be present because of the following reaction of the water present in the atmosphere under the consolidation condition: $2H_2 \leftrightarrow 2H_2 +$ $O_2$) by cutting bars from the blanks and polishing them to near net shape dimension. The initial hydrogen concentrations in the consolidated glass blanks before hydrogen loading were below the Raman detection limit.

For Sample Nos. 1-20 and 22-24, thin slices were cut from the ends of the bars and polished to 1 mm thickness for OH concentration ([OH]) and fictive temperature ($T_f$) measurements before hydrogen loading. The bars, except for those of Sample Nos. 7, 9, 18, 23 and 24, were subsequently loaded into a vessel and heated in a $H_2$—$N_2$ atmosphere containing 4% (by volume) $H_2$ under the conditions shown in TABLE I. Sample Nos. 7 and 9 were heat treated in 6% $H_2$—$N_2$ at 1 atm total pressure. Sample No. 18 was heat treated in a 25% $H_2$—$N_2$ atmosphere at 1 atm total pressure. Sample Nos. 23 and 24 were heat treated in pure $H_2$ at 100 atm. After $H_2$ loading, the ends of the bars were ground and optically polished to the final length. Concentrations of $H_2$ ([$H_2$]) were then measured by Raman spectroscopy. Initial transmission was measured using a spectrophotometer. Internal transmission at 193 nm ($T_i$) was calculated by correcting the data for surface reflection losses and normalizing to a 10 mm pathlength in the usual manner. Laser induced wavefront distortion (bulk LIWFD) of the glass sample was measured in the usual manner after exposing the sample to a 4 kHz ArF excimer laser under the conditions shown in TABLE I. Normalized LIWFD (L633 and L193) were calculated as described above. FDT was measured as described above. The resulting dK/dF values are listed in TABLE I.

High-temperature $H_2$ loaded samples, Sample Nos. 21 and 25-31, were prepared from soot-to-glass silica blanks consolidated in atmosphere without the presence of specifically added hydrogen. Thus similar to the starting materials of Sample Nos. 1-20 and 22-24, above, the hydrogen levels in these samples before hydrogen loading were negligible and below detection limit. For glasses $H_2$ loaded at 1100° C. (Sample Nos. 29 and 31), a section of glass was cut from the blank. The glass was simultaneously annealed and hydrogen loaded by heating it in the $H_2$—$N_2$ gas atmosphere shown in TABLE I. The heating schedule was: room temperature to 1200° C. at 10° C./min, hold for 10 hours at 1200° C., cool to 1100° C. at 5° C./Hour, hold for 116 hours at 1100° C., cool to 900° C. at 5° C./Hour, then cool to room temperature at 30° C./Hour. For glasses $H_2$ loaded at 600° C. (Sample No. 21), 700° C. (Sample No. 30), or 800° C. (Samples Nos. 26 and 27), a section of glass was cut from the blank, heated in a 4% $H_2$—$N_2$ atmosphere at 5° C./min, held under the time/temperature/pressure conditions shown in TABLE I, then cooled to room temperature at 30° C./hour. Sample Nos. 25 and 28 were heat treated in a 6% $H_2$—$N_2$ atmosphere at 1 atm total pressure. Subsequent to $H_2$ loading, the glasses of Sample Nos. 21 and 25-31 were measured for [OH], $T_f$, [$H_2$], FDT, LIWFD and transmission. The results are shown in TABLE I.

From TABLE I, it is clear that Sample No. 18 exhibits low dK/dF ($1.42 \times 10^{-5}$ cm·pulse/mJ) and low compaction as indicated by the measured LIWFD at 633 nm (0.24 nm/cm). Sample No. 26 exhibits high dK/dF ($1.36 \times 10^{-3}$ cm·pulse/mJ) and high compaction as indicated by the measured LIWFD at 633 nm (1.13 nm/cm). Sample No. 29 exhibits low dK/dF and expansion. Sample No. 27 exhibits low dK/dF and, similar to Sample No. 29, exhibits near zero LIWFD.

Without intending to be bound by any particular theory, the present inventors endeavor to explain as follows the FDT behavior described above of synthetic silica glass in terms of reactions that occur during the $H_2$ loading process and during laser exposure.

During $H_2$ loading, $H_2$ reacts with silica to form SiH* and SiOH according to the reaction:

$$\equiv\text{Si}-\text{O}-\text{Si}\equiv + H_2 \rightarrow \equiv\text{SiH}^* + \equiv\text{Si}-\text{OH}, \quad \text{(viii)}$$

where "≡" denotes three bonds to bridging oxygens. Van der Steen, *Introduction and Removal of Hydroxyl Groups in Vitreous Silica*, G.H.A.M., Ph.D. Thesis, University of Eindhoven, 1976 studied this reaction between 1500-1800K, and found that the reaction is endothermic. Therefore, the reaction equilibrium shifts to the right with increasing temperature, i.e., more SiH* is formed as the $H_2$ loading temperature is increased. Based on simple thermodynamic considerations, SiH* can be minimized by decreasing $H_2$, decreasing loading T, or increasing ≡Si—OH. Since FDT scales with SiH*, FDT can be minimized in the same ways. Increasing the initial OH level in the glass is perhaps the most desirable option. The theory predicts that the higher the initial SiOH concentration ([OH]), the less SiH* will be formed and the lower the measured FDT (dK/dF). This prediction was confirmed experimentally by the samples in TABLE I.

ODCs can also form during $H_2$ loading. According to the following endothermic reaction:

$$2\equiv\text{Si}-\text{O}-\text{Si}\equiv + H_2 \rightarrow \equiv\text{Si}-\text{Si}\equiv + 2\equiv\text{Si}-\text{OH} \quad \text{(ix)}$$

ODCs can be minimized by the same things that minimize SiH*—decreasing $H_2$, decreasing loading T, or increasing ≡Si—OH.

Figure 4:
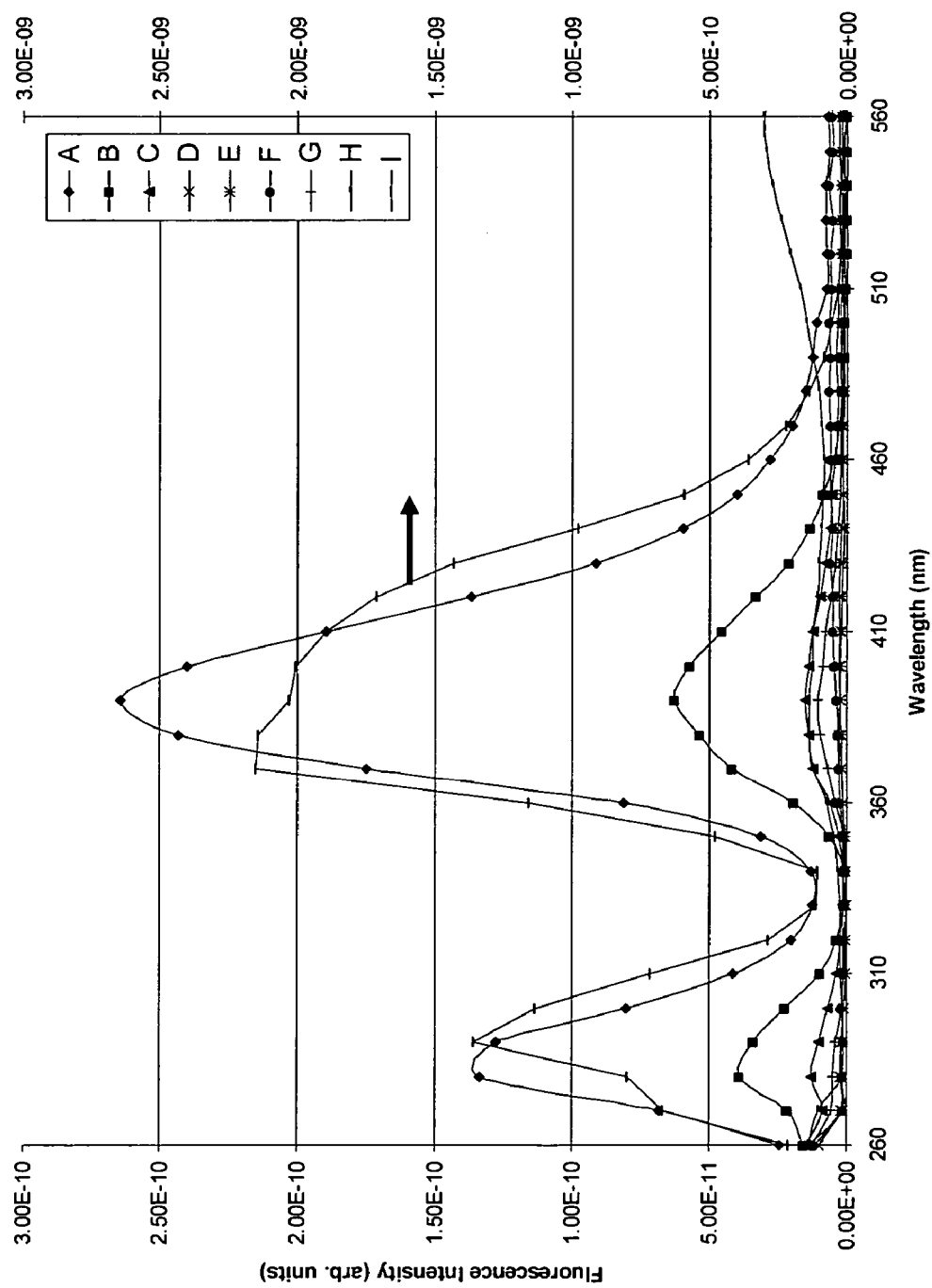
FIG. 4 is a diagram showing fluorescence spectra of a series of synthetic silica glass samples $H_2$ loaded at various temperatures.

One signature of ODCs is fluorescence bands at 290 nm and 390 nm with an excitation band around 248 nm. FIG. 4 shows fluorescence spectra of silica with different [OH] levels, $H_2$ loaded at different temperatures. Strong fluorescence bands are observed in the ~100 ppm OH glasses $H_2$ loaded at ≧800° C. (Glasses A and B) and in the glass $H_2$ loaded in consolidation (Glass I). No fluorescence is observed in ≦600° C. $H_2$ loaded glasses (Glasses D, E and F). The fluorescence bands are weak in the glass $H_2$ loaded at 700° C. (Glass C) and in the two glasses with >500 ppm OH, $H_2$ loaded at ≧800° C. (Glasses G and H). Thus, from experiment, we have confirmed that ODC formation during $H_2$ loading can be suppressed by increasing [OH] and/or decreasing $H_2$ loading temperature.

The present inventors have discovered that FDT of silica glass can be minimized by carefully annealing the silica glass prior to $H_2$ loading. Our data indicate that the annealing step reduces the number of reactive sites for forming ≡SiH* during $H_2$ loading.

As is indicated in TABLE I, some of the glass samples were subjected to a "slow" annealing treatment. Such "slow" anneal involves the following heating/cooling steps:

1) heating the glass to 1100° C.;
2) cooling the glass to 800° C. at 1° C./hour;
3) further cooling the glass to about 25° C. at 30° C./hour.

Samples of glass subjected to such slow annealing were then measured for Tf and [OH], and then $H_2$ loaded at under the conditions described in TABLE I. The $H_2$ loaded samples were then measured for FDT.

The term "fast" in the "Annealing" row in TABLE I means the relevant glass samples were not subjected to the slow annealing as described above, but were given only the following treatment prior to $H_2$ loading: the glass was placed in a furnace having a temperature of about 800° C., then heated to a temperature between 1000-1100° C. at over 200° C./hour, maintained at that temperature for less than 50 hours, cooled to a temperature of about 800° C. at over 200° C./hour and then air cooled to room temperature.

Comparing the dk/dF values for the "slow annealed" samples to "fast annealed" samples with the same OH levels shows that the "slow annealed" samples have lower FDT. The data are plotted in FIG. 1.

The slow annealing treatment appears to reduce the number of reactive sites for forming SiH* during $H_2$ loading. It has also been found that, for a given OH level, the level of SiH* in the "slow annealed" samples is lower than in the "fast annealed" samples. It is well known that the concentration of intrinsic defects increases with increasing fictive temperature of the glass. "Fast annealed" samples have a higher fictive (i.e. equilibrium) temperature than "slow annealed" samples, and are therefore predicted to have a higher concentration of ODCs (as well as other kinds of intrinsic defects such as strained Si—O bonds). Such intrinsic defects are expected to constitute, in part, sites which are highly reactive for the formation of SiH*.

Figure 2:
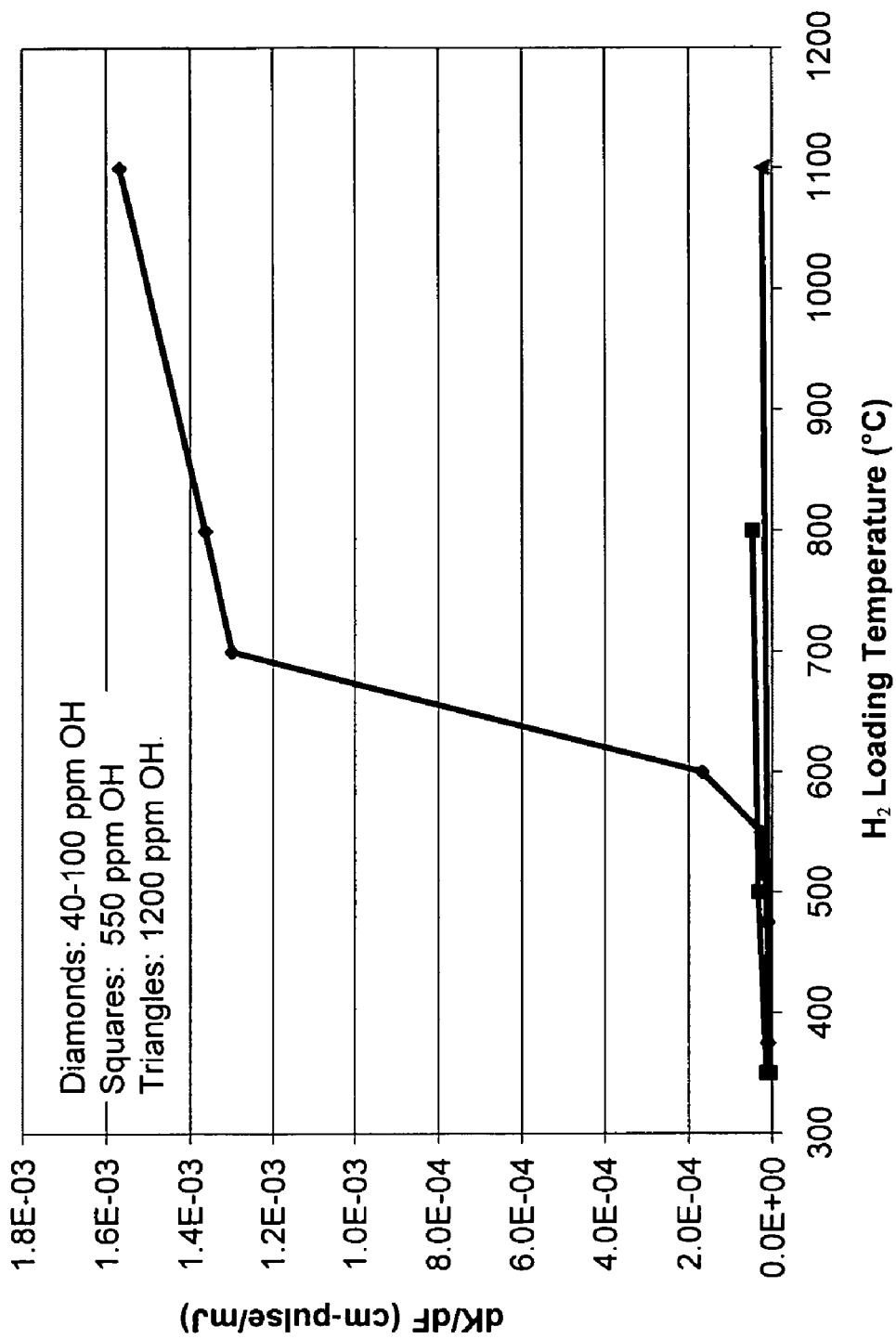
FIG. 2 is a diagram showing dK/dF as a function of $H_2$ loading temperature of a series of synthetic silica glass samples having various [OH].

Plotted in FIG. 2 is a graph of FDT as a function of $H_2$ loading temperature of a series of glasses. As is clear from this graph, for glasses with relatively high [OH], such as 550 ppm and 1200 ppm, the impact of $H_2$ loading temperature on FDT is not very high. However, for glasses with [OH] from about 40 to 100 ppm, FDT of samples loaded at high temperatures ($\geq 700°$ C.) is significantly higher than those loaded at lower temperatures ($\leq 550°$ C.).

Figure 3:
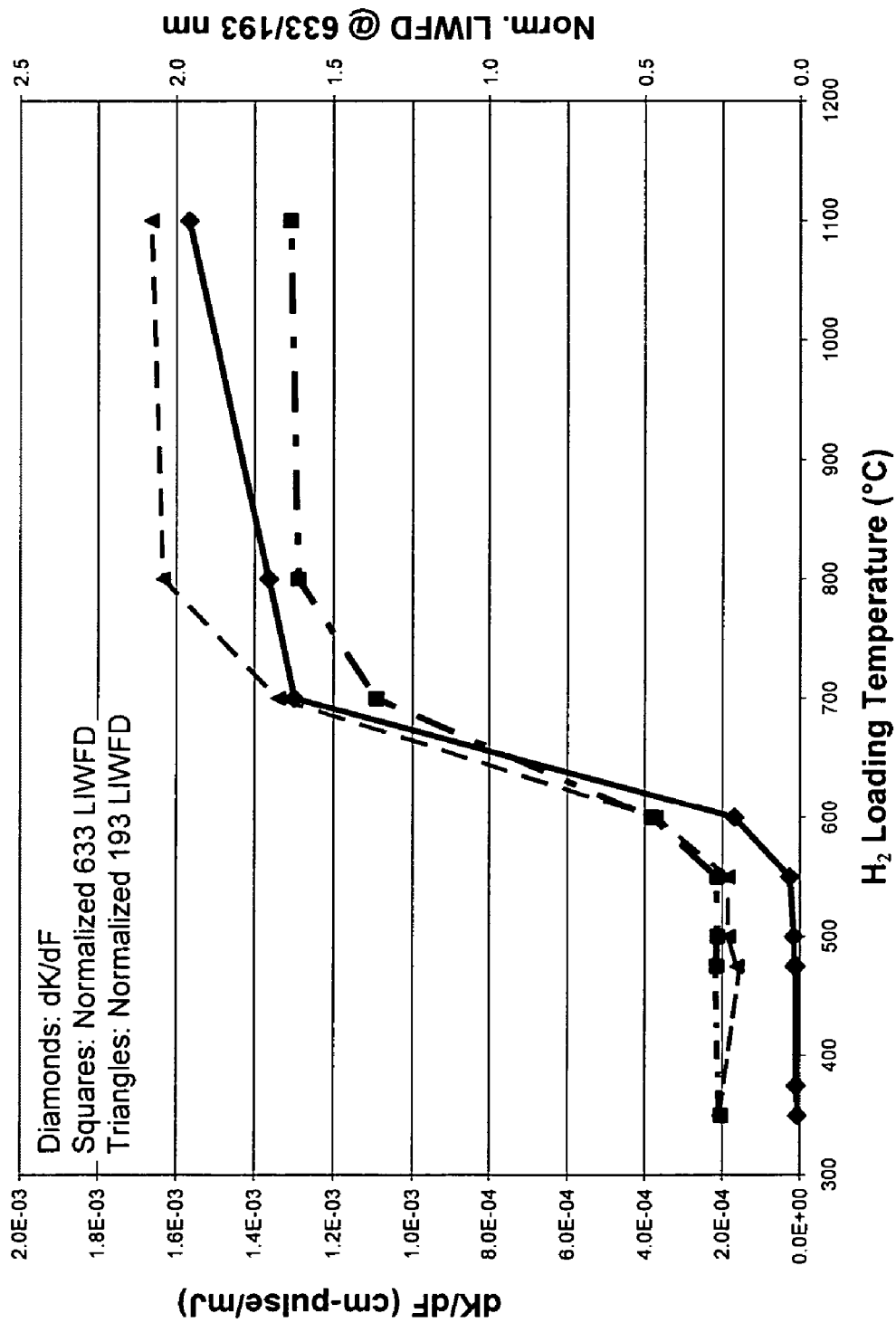
FIG. 3 is a diagram showing dK/dF and normalized 193 nm LIWFD measured at 633 nm and 193 nm as a function of $H_2$ loading temperature for a plurality of glass samples having [OH] between 40-100 ppm by weight.

In FIG. 3, the present inventors also plotted FDT and normalized LIWFD of a series of glasses having [OH] from 40-100 ppm as a function of the $H_2$ loading temperature of the glass. It is clear that normalized LIWFD measured at 193 nm and 633 nm and FDT of the glasses behave quite similarly. Thus, it is highly desirable that, in order to obtain synthetic silica glass with relatively low [OH] (less than about 160 ppm by weight, for example), low FDT and low LIWFD, it is highly desirable that the glass is $H_2$ loaded at a temperature below 700° C., preferably below 600° C., more preferably below about 500° C.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

TABLE I*

| | | Sample No. | | | | | | | | | |
|---|---|---|---|---|---|---|---|---|---|---|---|
| | | 1 | 2 | 3 | 4 | 5 | 6 | 7 | 8 | 9 | 10 |
| $H_2$ loading condition | Temperature (° C.) | 350 | 350 | 350 | 350 | 350 | 350 | 500 | 500 | 500 | 350 |
| | Atmosphere | A1 | A1 | A1 | A1 | A1 | A1 | A2 | A1 | A2 | A1 |
| | Pressure (psig) | 100 | 100 | 100 | 100 | 100 | 100 | 0 | 55 | 0 | 100 |
| Annealing | | Fast | Fast | Fast | Fast | Fast | Fast | Fast | Fast | Fast | Slow |
| Measured [OH] (ppmwt) | | 10 | 152 | 329 | 526 | 812 | 1200 | 94 | 572 | 572 | 146 |
| Measured [$H_2$] ($\times 10^{17}$ molecules/cm³) | | 2.3 | 1.76 | 1.6 | 1.6 | 1.6 | 2 | ~0.1 | 0.58 | ~0.1 | 1.4 |
| Measured $T_f$ (° C.) | | 1069 | 1066 | 1051 | 1034 | 1008 | 992 | 1072 | 1025 | 1024 | 987 |
| Measured $T_i$ @ 193 nm (%/cm) | | 99.75 | 99.78 | 99.83 | 99.82 | 99.83 | 99.73 | 99.78 | 99.75 | 99.76 | 99.71 |
| LIWFD measurement | Fluence (μJ/cm² · pulse) | 40 | 40 | 40 | 40 | 40 | 70 | 70 | 70 | 70 | 40 |
| | Bulk LIWFD @ 633 nm (nm/cm) | 0.4 | 0 | −0.20 | −0.37 | −0.8 | −1.42 | 0.42 | 0.05 | 0.26 | 0.05 |
| | Normalized L633 | | | | | | | | 0.24 | | |
| | Normalized L193 | | | | | | | | 0.20 | | |
| Measured dK/dF ($\times 10^{-6}$ cm · pulse/mJ) | | 39.3 | 7.65 | 25.6 | 17.5 | 10.8 | 5.93 | 13.9 | 33.3 | 19.7 | 0 |

| | | Sample No. | | | | | | | | | |
|---|---|---|---|---|---|---|---|---|---|---|---|
| | | 11 | 12 | 13 | 14 | 15 | 16 | 17 | 18 | 19 | 20 |
| $H_2$ loading condition | Temperature (° C.) | 350 | 350 | 350 | 350 | 375 | 375 | 475 | 475 | 500 | 550 |
| | Atmosphere | A1 | A1 | A1 | A1 | A1 | A1 | A1 | A3 | A1 | A1 |
| | Pressure (psig) | 100 | 100 | 100 | 43 | 85 | 85 | 85 | 0 | 80 | 50 |
| Annealing | | Slow | Slow | Slow | Fast | Fast | Fast | Fast | Fast | Fast | Fast |
| Measured [OH] (ppmwt) | | 316 | 514 | 1126 | 100 | 61 | 87 | 43 | 57 | 99 | 52 |
| Measured [$H_2$] ($\times 10^{17}$ molecules/cm³) | | 1.6 | 1.57 | 1.23 | 1.7 | 0.84 | 0.79 | 0.49 | 0.45 | 0.8 | 0.72 |
| Measured $T_f$ (° C.) | | 979 | 960 | 912 | | 1062 | 1072 | 1122 | 1114 | 1066 | 1075 |
| Measured $T_i$ @ 193 nm (%/cm) | | 99.81 | 99.80 | 99.79 | 99.81 | 99.80 | 99.80 | 99.83 | 99.76 | 99.83 | 99.79 |
| LIWFD measurement | Fluence (μJ/cm² · pulse) | 40 | 40 | 40 | 40 | | | | 50 | 70 | 95 |
| | Bulk LIWFD @ 633 nm (nm/cm) | −0.18 | −0.38 | −0.62 | 0.18 | | | | 0.24 | 0.34 | 0.56 |
| | Normalized L633 | | | | 0.25 | | | | 0.27 | 0.27 | 0.27 |
| | Normalized L193 | | | | 0.26 | | | | 0.20 | 0.23 | 0.23 |
| Measured dK/dF ($\times 10^{-6}$ cm · pulse/mJ) | | 5.10 | 3.10 | 1.89 | 5.36 | 8.01 | 10.8 | 9.58 | 14.2 | 15.8 | 25.9 |

| | | Sample No. | | | | | | | | | |
|---|---|---|---|---|---|---|---|---|---|---|---|
| | | 21 | 22 | 23 | 24 | 25 | 26 | 27 | 28 | 29 | 30 | 31 |
| $H_2$ loading condition | Temperature (° C.) | 600 | 350 | 350 | 350 | 800 | 800 | 800 | 800 | 1100 | 700 | 1100 |
| | Atmosphere | A1 | A1 | A4 | A4 | A2 | A1 | A1 | A2 | A1 | A1 | A1 |
| | Pressure (psig) | 70 | 50 | 1455 | 1455 | 0 | 70 | 70 | 0 | 70 | 70 | 70 |
| Annealing | | Fast | Fast | Fast | Fast | Fast | Fast | Fast | Fast | Fast | Fast | Fast |
| Measured [OH] (ppmwt) | | 98 | 537 | 86 | 873 | 93 | 86 | 554 | 627 | 1088 | 103 | 91 |
| Measured [$H_2$] ($\times 10^{17}$ molecules/cm³) | | 0.78 | ~0.7 | 625.9 | 614.2 | ~0.1 | 0.35 | 0.66 | ~0.1 | 0.5 | 0.7 | 0.54 |
| Measured $T_f$ (° C.) | | 1072 | | 1078 | 1007 | 1065 | 1078 | 1027 | | | 1080 | 1053 |
| Measured $T_i$ @ 193 nm (%/cm) | | | 99.79 | 99.85 | 99.84 | 99.69 | 99.69 | 99.76 | 99.77 | 99.72 | | 99.75 |

TABLE I*-continued

| | | | | | | | | | | | | |
|---|---|---|---|---|---|---|---|---|---|---|---|---|
| LIWFD measurement | Fluence (μJ/cm²·pulse) | 70 | | | | 40 | 40 | 70 | 70 | 40 | 70 | 40 |
| | Bulk LIWFD @ 633 nm (nm/cm) | 0.48 | | | | 0.52 | 1.13 | −0.09 | 0.25 | −0.55 | 1.56 | 1.18 |
| | Normalized L633 | 0.48 | | | | 0.76 | 1.61 | | | | 1.36 | 1.64 |
| | Normalized L193 | 0.46 | | | | 0.87 | 2.04 | | | | 1.67 | 2.08 |
| Measured dK/dF (×10⁻⁶ cm·pulse/mJ) | | 168 | 13.7 | 10.0 | 8.90 | 642 | 1360 | 47.8 | 24.7 | 24.1 | 1300 | 1570 |

*Notes:
In this table, the following signs have the following defined meaning:
ppmwt: ppm by weight;
A1: $H_2/N_2$ mixture comprising 4% $H_2$ by volume;
A2: $H_2/N_2$ mixture comprising 6% $H_2$ by volume;
A3: $H_2/He$ mixture comprising 25% $H_2$ by volume; and
A4: $H_2$.

What is claimed is:

1. A synthetic silica glass material consisting essentially of silica, OH groups, and $H_2$ and having an OH concentration of lower than about 900 ppm by weight, an $H_2$ level of about $1\times10^{16}$ to about $5\times10^{17}$ molecules/cm³, and a fictive temperature of less than 1070° C., wherein the silica glass material has a measured FDT (dK/dF) when exposed to excimer laser at about 193 nm of less than $5.0\times10^{-4}$ cm·pulse/mJ.

2. A synthetic silica glass material according to claim 1, comprising OH in the amount by weight of about 10-500 ppm.

3. A synthetic silica glass material according to claim 1, comprising OH in the amount by weight of about 100-700 ppm.

4. A synthetic silica glass material according to claim 1 exhibiting a bulk laser induced wavefront distortion, measured at 633 nm, of between about −1.0 and 1.0 nm/cm, when subject to 10 billion pulses of an excimer laser at about 193 nm having a fluence of approximately 70 μJ/cm²·pulse and a pulse length of about 25 ns.

5. A synthetic silica glass material according to claim 1 exhibiting a normalized laser induced wave-front distortion L633 when subjected to excimer laser pulses at about 193 nm, measured at about 633 nm, wherein $0 \leq L633 \leq 1.0$.

6. A synthetic silica glass material according to claim 1 exhibiting a normalized laser induced wave-front distortion L193 when subjected to excimer laser pulses at about 193 nm, measured at about 193 nm, wherein $0 \leq L193 \leq 1.0$.

7. A synthetic silica glass material according to claim 5, wherein the glass has an OH concentration of less than or equal to about 160 ppm by weight.

8. A synthetic silica glass material according to claim 6, wherein the glass has an OH concentration of less than or equal to about 160 ppm by weight.

9. A process for hydrogen loading a transparent consolidated synthetic silica glass material consisting essentially of silica, OH groups, and $H_2$ and having an OH concentration of lower than or equal to about 900 ppm by weight, comprising annealing the synthetic silica glass material in an annealing step such that the synthetic silica glass material has a fictive temperature of less than 1070° C., and treating the glass in the presence of $H_2$ gas at a temperature lower than 700° C. to a loaded $H_2$ level between about $1\times10^{16}$ to about $5\times10^{17}$ molecules/cm³, such that the glass has a FDT of less than $5.0\times10^{-4}$ cm·pulse/mJ when exposed to excimer laser radiation at about 193 nm.

10. A process according to claim 9, wherein the synthetic silica glass before hydrogen loading has an $H_2$ content lower than about $1.0\times10^{15}$ molecules/cm³.

11. A process according to claim 9, wherein the synthetic silica glass is subject to an annealing step before the hydrogen loading treatment, such that the silica glass obtained has a fictive temperature between about 800-1070° C.

12. A process according to claim 9, wherein the synthetic silica glass comprises OH in the amount by weight of from about 10 to about 500 ppm.

13. A process according to claim 9, wherein before hydrogen loading, the synthetic silica glass has an $H_2$ level of less than about $1\times10^{16}$ molecules/cm³.

* * * * *